United States Patent [19]

van Dorsselaer

[11] Patent Number: 4,965,843

[45] Date of Patent: Oct. 23, 1990

[54] METHOD AND APPARATUS FOR CODING DIGITAL IMAGE INFORMATION OBTAINED FROM DITHERING

[75] Inventor: Etienne L. M. E. van Dorsselaer, Sintjansteen, Netherlands

[73] Assignee: OCE Nederland B.V., Venlo, Netherlands

[21] Appl. No.: 148,593

[22] Filed: Jan. 26, 1988

[30] Foreign Application Priority Data

Jan. 27, 1987 [NL] Netherlands .......................... 8700182

[51] Int. Cl.$^5$ .............................................. G06K 9/00
[52] U.S. Cl. ...................................... 382/50; 358/429; 358/457; 382/56
[58] Field of Search ........................ 382/56, 50, 52, 53; 358/260, 283, 209, 284, 263, 429, 430, 455, 456, 470, 457

[56] References Cited

U.S. PATENT DOCUMENTS

| | | | |
|---|---|---|---|
| 3,726,993 | 4/1973 | Lavallee | 358/470 |
| 4,013,828 | 3/1977 | Judice | 358/209 |
| 4,266,249 | 5/1981 | Chai et al. | 358/429 |

*Primary Examiner*—Leo H. Boudreau
*Attorney, Agent, or Firm*—Reed Smith Shaw & McClay

[57] ABSTRACT

Coding of digital data corresponding to a dithered image. The digital pixel values determined by comparison with a given threshold value of the dither matrix are combined to form a string. A string of this kind is formed for all the threshold values of the dither matrix. Strings found which are built up largely of a given pixel value are immediately converted into strings built up entirely of that pixel value, and are coded collectively. The other strings found are coded individually by comparing each of them with a set of standard strings and replacing them by the most similar standard string.

8 Claims, 3 Drawing Sheets

METHOD AND APPARATUS FOR CODING DIGITAL IMAGE INFORMATION OBTAINED FROM DITHERING

FIELD OF THE INVENTION

The invention relates to a method and apparatus for coding digital image information obtained by dithering an image wherein the image data is arranged in data strings associated with dither threshold values and coding such strings.

BACKGROUND OF THE INVENTION

It is known to code digital image information obtained by dithering an image by combining in a predetermined order the binary dither values of the pixels compared during dithering with the same threshold value of the dither matrix used to form strings. These strings are then compressed.

For example, U.S. Pat. No. 3,967,052 discloses a method of forming strings using a part of the dithered image. The strings are formed from the binary pixel values corresponding to one and the same threshold value of the dither matrix. These strings are then individually compressed such as by the run length method wherein the numbers of consecutive equal values in the strings are determined.

Using these methods, images having little variation in grey value, i.e., wherein pixels which correspond to the same threshold value of the dither matrix have the same value (1 or 0) over a wide area, leads to an effective reduction in data required for storing or transmitting the picture image information.

Also of interest is U.S. Pat. No. 4,013,828 wherein groups of pixels are dithered to produce patterns of binary pixel values. Each pattern is compared to a pattern dictionary and, if found, is replaced by an associated code word. Patterns not found in the dictionary are added to it and given a code. Patterns that closely resemble other patterns could be replaced by the code word for the resembled pattern. The coding of this information is addressed for use in transmission by transmitting the code and the dictionary.

Transmission coding is also described in Proceedings of S.I.D., vol 17/2, 1976, p.92–101, entitled *Data Reduction of Dither Coded Images by Bit Interleaving*, by Judice. In this method, each group of pixels that have been processed together during dithering is separately encoded. The binary pixel values are combined into a string in an order corresponding to the numerical order of the dither thresholds they been dithered with. This string is run-length coded.

In U.S. Pat. No. 4,266,249 a method is described for coding image data for transmission in which multiple level pixel values are coded by two circuits. A high and low frequency circuit is provided. In the low frequency circuit a group of pixels is dithered to produce a pattern of binary pixel values. This pattern is coded by comparing it to a very small dictionary of standard patterns and replacing it by an associated code word. Thereafter the high and low frequency data is combined. However, the procedure for combining the data is highly complicated.

SUMMARY OF THE INVENTION

The present invention provides an improved method and apparatus for reducing or compressing the data necessary for storage or transmission. Generally the invention utilizes techniques described in the prior art but in such a way to obtain greater image compression without loss of information. In particular, the invention provides a method for compressing data by (a) determining a maximum threshold value $d_{max}$ and a minimum threshold value $d_{min}$ of the dither matrix, (b) allocating an individual code to each string associated with a threshold value in the range bounded by $d_{min}$ and $d_{max}$; and (c) allocating at least one group code to the two groups of strings associated with threshold values above or below the range bounded by $d_{min}$ and $d_{max}$.

Consequently, only those strings of the strings to be coded are individually coded which contains the most image information. The other strings containing less image information can be processed collectively.

It has been found that the image information of most interest for image formation is formed by the content of the strings having the greatest pixel value variations. Also, that these strings always correspond to a group of contiguous threshold values of the dither matrix. The quality of the dithered image appears to be little affected when a pixel is altered in value here and there.

The collective coding of the strings associated with threshold values above or below the range bounded by $d_{min}$ and $d_{max}$ is possible because these strings appear to consist virtually completely of a single pixel value, namely one pixel value for the strings associated with threshold values above the range bounded by $d_{min}$ and $d_{max}$, and the other pixel value for the strings associated with threshold values below that range. Consequently, these strings can readily be replaced by a string consisting entirely of the particular pixel value concerned. This leads to a substantial data reduction.

In an embodiment of the method according to the invention, the minimum threshold value $d_{min}$ and the maximum threshold value $d_{max}$ are determined by reference to the number of pixels of one value and the number of pixels of the other value in the strings obtained. Consequently, the threshold value range within which the strings are individually coded is adapted dynamically to the information content of the part of the image to be coded. This considerably increases the reduction in data.

In another embodiment of the invention, for allocation of the individual code to a string, the standard string most similar to the string to be coded is selected from a set of standard strings and the individual code comprises an identification of the selected standard string. This procedure leads to a further reduction in the number of data needed to code the string and, therefore, enhances the overall effect of the method. A carefully compiled set of standard strings can be considerably smaller than the number of possible strings without any noticeable impairment of image quality.

In another embodiment of the method according to the invention, the group code of the group of strings associated with threshold values aboVe the range bounded by $d_{min}$ and $d_{max}$ comprises an identification of $d_{max}$ and the group code of the group of strings associated with threshold values below the range bounded by $d_{min}$ and $d_{max}$ comprises an identification of $d_{min}$. A code of this kind is sufficient to indicate which strings have been coded as a group, from which it can be immediately deduced which strings have been individually coded.

The advantages of the invention will become apparent from a perusal of a detailed description of the invention taken in connection with the accompanying drawings.

PRESENTLY PREFERRED EMBODIMENT

Figures 1, 2:
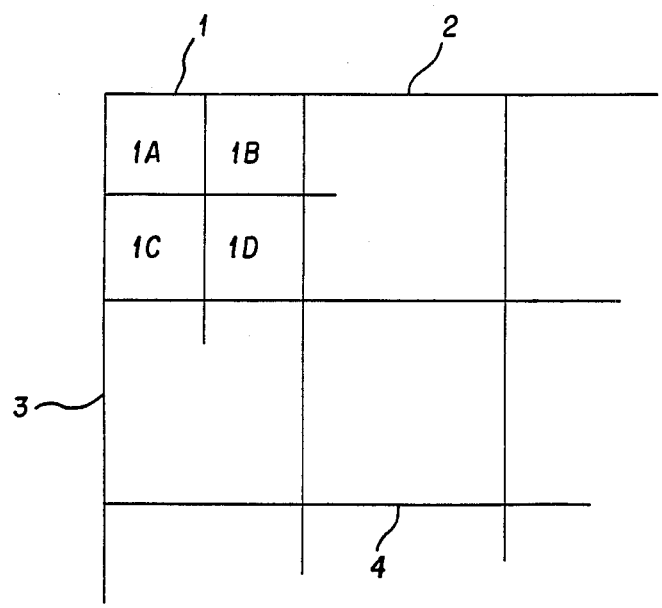
FIG. 1 represents part of an image to be coded which is shown divided into blocks.
FIG. 2 is a dither matrix with which the original image was dithered.

FIG. 1 represents a part of an image more particularly the top lefthand corner, a photograph, for example. This image is dithered by means of the dither matrix represented in FIG. 2. Preferably, the image is divided into a number of blocks 1A, 1B, 1C and 1D. Each block comprises a number of pixels which, in number and positioning, are identical to the elements of the dither matrix. The grey level of each of the pixels is then determined, for example, in the manner described in the above-mentioned U.S. Pat. No. 3,967,052. The analog grey level of each pixel is then compared with a given threshold value which is obtained from the value of the corresponding element of the dither matrix. If the grey level is greater than the threshold value, that pixel is given the dither value 1 corresponding to a black pixel in the dithered image. If, however, the grey level is less than the said threshold value, the pixel is given the dither value 0, corresponding to a white pixel. Dithering of this kind is generally known to those skilled in the art and requires no further explanation. See, for instance, U.S. Pat. No. 3,967,052.

Figure 3:
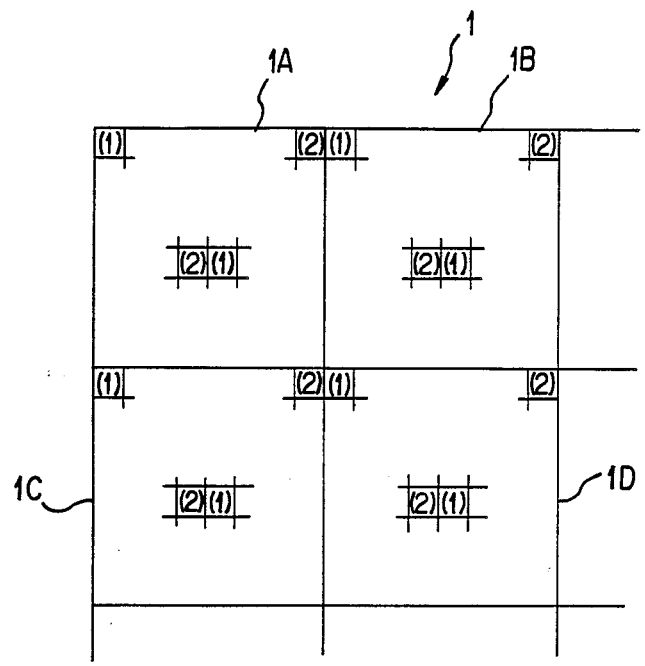
FIG. 3 represents a superblock as processed by the method according to the invention.

The image information is then compressed, for example, by combining four blocks 1A to 1D into a superblock 1 as represented in FIG. 3. In this Figure, the pixels compared with the threshold values "1" and "2" of the dither matrix, are indicated by the numerals "(1)" and "(2)", respectively. The pixels belonging to each given threshold value in the superblock are then collected and their dither values (0 or 1) combined into a string in a predetermined order. Since each threshold value occurs twice in the dither matrix used, each string comprises eight bits, being the dither values of eight pixels. A string is determined in this way for each threshold value of the dither matrix. The dither matrix used comprises 32 different thresholds values, so that 32 strings are formed.

The number of possible different forms of a string of 8 bits is $2^8 = 256$. However, the image information can be coded with only a slight loss of quality with fewer bits per string. To this end, the strings are compared one by one with a set of standard strings, the standard string most similar to a string to be coded is selected from the set and a unique code associated with the selected standard string is allocated to the string to be coded.

The set of standard strings is considerably smaller than the set of all possible strings, e.g., 64 ($=2^6$). The resulting compression has a factor of 1.33 (i.e., 6 bits instead of 8 bits). This method is based on the empirical finding that the quality of an image does not appreciably deteriorate if a pixel here and there has the wrong value.

However, an even greater compression can be achieved by only coding part of the strings individually. Accordingly, to each superblock, a minimum threshold value $d_{min}$ and a maximum threshold value $d_{max}$ are allocated and all the strings belonging to threshold values below $d_{min}$ are converted into strings consisting entirely of ones, and all the strings belonging to threshold values greater than $d_{max}$ are converted into strings consisting entirely of zeroes. These two groups of strings are not individually coded, however, rather they are coded as a group by means of a code comprising the value of $d_{min}$ and $d_{max}$, respectively.

In this case, the coded signal contains only the following details: the value of $d_{min}$, the value of $d_{max}$, and the codes of the strings coded by means of standard strings.

This method is based on the finding that a superblock contains less than all of the grey levels, and that those grey levels that it does contain are usually closely situated together. This is because a superblock is only a very small segment of the total image, and the grey level distribution in an analog image is usually of a low-frequency. Consequently, most strings of a superblock will consist entirely or almost entirely of identical dither values. For example, a superblock whose grey level is situated approximately in the middle of the scale will, for the low threshold values, give strings consisting completely or practically completely of ones, and, for high thresholds values, strings consisting completely or practically completely of zeroes. Only the threshold values in the middle area give strings having a considerable variation in ones and zeroes. Since the limited grey level scale in a superblock does not affect the same part of the total scale in each superblock, the threshold values required to be coded will also differ for different superblocks. Generally, however, a minimum threshold value $d_{min}$ and a maximum threshold value $d_{max}$ can always be defined, between which the strings must be individually coded, while this is unnecessary outside the same.

The values of $d_{min}$ and $d_{max}$ can be defined on the basis of experience concerning the information content of the average image. Preferably, however, it is better to determine $d_{min}$ and $d_{max}$ separately for each superblock by referene to the distribution of the pixel values in the strings, as described more fully hereinafter. Maximum compression is obtained in this way.

In this case, the strings are examined for the numbers of ones and zeroes in the order of the threshold values to which they belong. According to the above considerations, the string belonging to the lowest threshold value will practically certainly consist entirely of ones. With increasing threshold values there will always be more zeroes appearing in the strings. The value given to $d_{min}$ is the threshold value at which the number of zeroes exceeds a predetermined number $n_0$. As the threshold values increase, the number of zeroes will always increase and the number of ones will decrease until the strings contain only zeroes. The value selected for $d_{max}$ is the threshold value at which the number of ones falls below a predetermined number $n_1$.

The image information of a portrait photograph dithered by means of the dither matrix shown in FIG. 2 was coded in the manner described above. For this purpose, the dithered image was divided into superblocks having a size of $16 \times 16$ pixels. Thus, each threshold value occurred eight times in each superblock.

For coding, 64 standard strings were used. As discussed above, this coding gives a compression having a factor of 1.33.

For the coding with the method according to the invention the values $n_0$ and $n_1$ were set to 3. On completion of the coding the results were analyzed, showing that in each superblock on average only 5 out of the 32 strings were coded according to standard strings, so that the total data reduction proved to be 6.34, while the image quality had not appreciably deteriorated.

Figure 4:
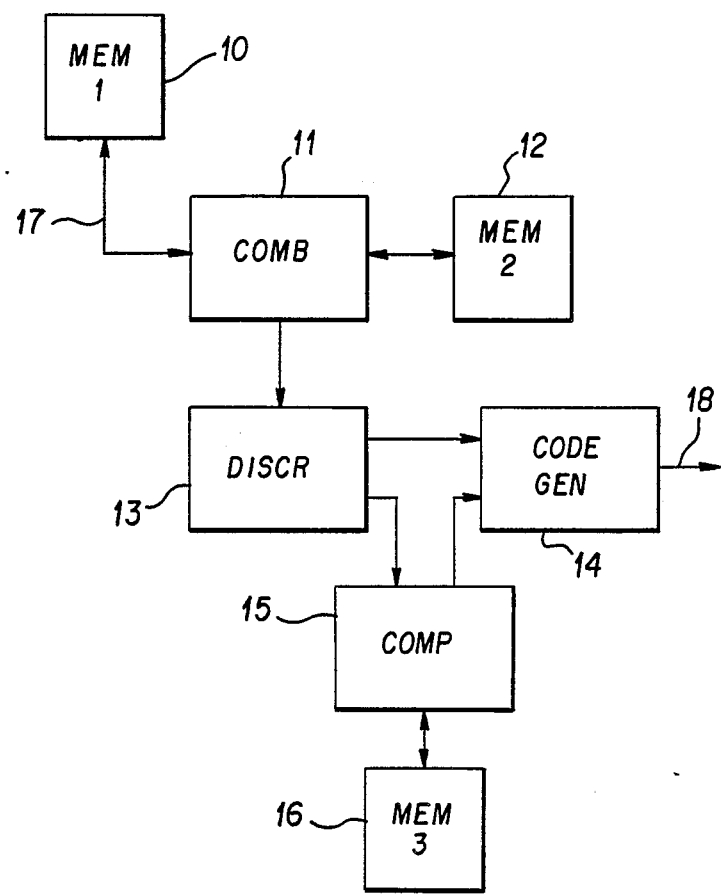
FIG. 4 represents a diagrammatic view of an apparatus according to the invention.

FIG. 4 diagrammatically represents an apparatus for coding image information using the method according to the invention. The apparatus comprises a first memory 10 in which the dithered image information to be coded is stored in the form of the dither values of the pixels. A combiner 11 is connected to memory 10 via data bus 17, to second memory 12, in which the threshold values of the dither matrix used are stored, and to discriminator 13. Discriminator 13 is also connected to code generator 14 and comparator 15, the latter being connected to the code generator 14 and to third memory 16 in which the set of standard strings is stored with a code for each standard string. Code generator 14 has an output 18 for the coded signal. Output 18 may be connected, for example, to a memory or a transmitting installation.

The dither values of the pixels associated with a superblock are read out by combiner 11 from first memory 10 and combined to form strings of dither values each associated with one of the threshold values of the dither matrix originally used in determining the dither values. To this end, the combiner 11 makes use of the data about the dither matrix stored in second memory 12. These strings appear consecutively at the output of combiner 11 in ascending order of threshold values, i.e., first the string associated with the threshold value 1, then the string associated with the threshold value 2, and so on. This information is processed by discriminator 13.

As described above, the first strings associated with low threshold values are entirely or substantially entirely in the form of ones. The number of zeroes in these strings is therefore less than the number $n_0$, but the number of zeroes rises with increasing threshold value. When the number of zeroes equals the number $n_0$, discriminator 13 transmits the associated threshold value directly to the code generator 14 which defines this threshold value as $d_{min}$. Discriminator 13 transmits the next strings, i.e., the strings associated with thresholds values $d_{min}$, $d_{min}+1$, $d_{min}+2$ and so on, one by one, to comparator 15 where they are coded in accordance with the standard strings method. Comparator 15 compares these strings with the standard strings in its set stored in memory 16. For each string, comparator 15 transmits to code generator 14 the code belonging to the standard string most similar to the string found.

As the threshold values increase further, the number of ones decreases continuously and the number for zeroes increases continuously, until the number of ones becomes finally less than the number $n_1$. Discriminator 13 then stops transmitting the strings to comparator 15 and sends the particular threshold value concerned directly to code generator 14 which defines it as $d_{max}$. The subsequent strings are no longer individually coded.

Code generator 14 then combines the coded image data to form a code signal containing the values of $d_{min}$ and $d_{max}$ and the codes of the coded strings and transmits this signal via connection to a memory unit or transmitting installation (not shown). Consequently, the strings associated with a threshold value d for which $d < d_{min}$ or $d < d_{max}$ holds, do not form part of the code signal, but this is acceptable since it is known that strings associated with thresholds values less than $d_{min}$ consist entirely of ones and strings associated with threshold values greater than $d_{max}$ consist entirely of zeroes.

Although the invention has been described with reference to the above example, it is not limited thereto. Those skilled in the art will see that various alternative embodiments are possible without departing from the scope of the claims. For example, the use of blocks and superblocks with different dimensions and of different values for $n_0$ and $n_1$, which may also differ from one another. The apparatus described can be embodied by means of discrete electronic circuits but can also have the form of programs in a computer. Accordingly, the invention may be otherwise embodied within the scope of the appended claims.

What is claimed is:

1. A method of coding digital image information obtained by dithering of an image consisting of pixels with a dither matrix, said method comprising (1) combining in a predetermined order binary dither values of said pixels compared during dithering with the same threshold value of the dither matrix to form strings each associated with one threshold value and (2) subjecting all of said strings to a compression operation wherein said compression comprises the steps of
    (a) selecting a threshold value $d_{max}$ and a threshold value $d_{min}$ of said dither matrix, dividing the threshold values into at least two ranges;
    (b) allocating an individual code to each string associated with a threshold value in the range bounded by $d_{min}$ and $d_{max}$; and
    (c) allocating at least one group code to the two groups of strings associated with threshold values above or below the range bounded by $d_{min}$ and $d_{max}$.

2. A method according to claim 1, wherein said $d_{min}$ and $d_{max}$ are selected by reference to the number of pixels of one binary value and the number of pixels of the other value in the strings formed.

3. A method according to claim 1 or 2, wherein for said allocation of said individual code to a string, a standard string most similar to said string to be coded is selected from a set of standard strings and wherein the individual code comprises an identification of said selected standard string.

4. A method according to claim 1 or 2, wherein said group code for said group of strings associated with threshold values above a range bounded by $d_{min}$ and $d_{max}$ includes an identification of $d_{max}$ and for said group of strings associated with threshold values below the range bounded by $d_{min}$ and $d_{max}$ includes an identification of $d_{min}$.

5. An apparatus for coding digital image information obtained by dithering with a dither matrix, an image consisting of pixels comprising
    a. means for combining in a predetermined order binary dither values of said pixels compared during dithering with the same threshold value of said dither matrix to form strings each associated with one threshold value;
    b. discriminator means connected to said combining means for selecting a threshold value ($d_{max}$) and a threshold value ($d_{min}$) and for allocating at least one group code to the two groups of strings associated with threshold values above and below a range bounded by $d_{min}$ and $d_{max}$;

c. comparator means connected to said discriminator means for allocating an individual code to strings associated with threshold values in the range bounded by $d_{min}$ and $d_{max}$; and d. code generator means connected to said discriminator means and said comparator means for receiving codes outputted thereby and for generating a code sequence corresponding to said received codes.

6. An apparatus as set forth in claim 5, comprising a general purpose computer, wherein each of said means is a computer process and said associated functions are carried out under the control of a program.

7. Apparatus as set forth in claim 5, wherein said discriminator means is adapted to select the values of $d_{max}$ and $d_{min}$ by reference to the number of pixels of one value and the number of pixels of the other value in the formed strings.

8. Apparatus as set forth in claim 5, wherein said comparator means is adapted to select, in the process of allocating an individual code to a string, from a set of standard strings a standard string most similar to the string to be individually coded and to allocate a code associated with that standard string to the string to be individually coded.

* * * * *